United States Patent
Chen et al.

(10) Patent No.: US 10,592,801 B2
(45) Date of Patent: Mar. 17, 2020

(54) APPARATUS AND METHODS FOR FORWARD PROPAGATION IN CONVOLUTIONAL NEURAL NETWORKS

(71) Applicant: Cambricon Technologies Corporation Limited, Beijing (CN)

(72) Inventors: Tianshi Chen, Beijing (CN); Dong Han, Beijing (CN); Yunji Chen, Beijing (CN); Shaoli Liu, Beijing (CN); Qi Guo, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 16/174,155

(22) Filed: Oct. 29, 2018

(65) Prior Publication Data

US 2019/0073583 A1    Mar. 7, 2019

Related U.S. Application Data

(63) Continuation-in-part of application No. PCT/CN2016/080967, filed on May 4, 2016.

(30) Foreign Application Priority Data

Apr. 29, 2016    (CN) .......................... 2016 1 0282534

(51) Int. Cl.
    *G06E 1/00*      (2006.01)
    *G06E 3/00*      (2006.01)
    (Continued)

(52) U.S. Cl.
    CPC ............. *G06N 3/0454* (2013.01); *G06F 9/30* (2013.01); *G06F 9/3001* (2013.01);
    (Continued)

(58) Field of Classification Search
    CPC .......... G06F 13/362; G06F 17/16; G06F 9/30; G06F 9/3001; G06N 3/0454; G06N 3/063
    See application file for complete search history.

(56) References Cited

U.S. PATENT DOCUMENTS 5,204,938 A       4/1993  Skapura et al.
9,153,230 B2 *   10/2015  Maaninen ............... G10L 15/16

FOREIGN PATENT DOCUMENTS

CN       1584824 A     2/2005
CN     103150596 A     6/2013
(Continued)

OTHER PUBLICATIONS

T. Chen, et al., "A Small-Footprint Accelerator for Large-Scale Neural Networks", ACM Transactions on Computer Systems, vol. 33, No. 2, Article 6, May 2015, 27 pages.
Z. Du, et al., "An Accelerator for High Efficient Vision Processing", IEEE Transactions on Computer-aided Design of Integrated Circuits and System, vol. 36, No. 2, Feb. 2017, pp. 227-240.
(Continued)

*Primary Examiner* — Luis A Sitiriche
(74) *Attorney, Agent, or Firm* — Getech Law LLC; Jun Ye (57) ABSTRACT

Aspects for forward propagation of a convolutional artificial neural network are described herein. The aspects may include a direct memory access unit configured to receive input data from a storage device and a master computation module configured to select one or more portions of the input data based on a predetermined convolution window. Further, the aspects may include one or more slave computation modules respectively configured to convolute a convolution kernel with one of the one or more portions of the input data to generate a slave output value. Further still, the aspects may include an interconnection unit configured to combine the one or more slave output values into one or more intermediate result vectors, wherein the master computation module is further configured to merge the one or
(Continued)

more intermediate result vectors into a merged intermediate vector.

17 Claims, 6 Drawing Sheets

(51) Int. Cl.
- *G06F 15/18* (2006.01)
- *G06G 7/00* (2006.01)
- *G06N 3/00* (2006.01)
- *G06N 3/04* (2006.01)
- *G06F 9/30* (2018.01)
- *G06F 13/362* (2006.01)
- *G06F 17/16* (2006.01)
- *G06N 3/063* (2006.01)

(52) U.S. Cl.
CPC ............ *G06F 13/362* (2013.01); *G06F 17/16* (2013.01); *G06N 3/063* (2013.01)

(56) References Cited

FOREIGN PATENT DOCUMENTS

| CN | 104809426 A | 7/2015 |
|---|---|---|
| CN | 105184366 A | 12/2015 |
| CN | 105488565 A | 4/2016 |
| CN | 105512723 A | 4/2016 |
| WO | WO 2017/185386 A1 | 11/2017 |

OTHER PUBLICATIONS

S. Liu, et al., "Cambricon: An Instruction Set Architecture for Neural Networks", 2016 ACM/IEEE 43rd Annual International Symposium on Computer Architecture, Oct. 12, 2016, pp. 393-405.

S. Zhang, et al., "Cambricon-X" An Accelerator for Sparse Neural Networks, The 49th Annual IEEE/ACM International Symposium on Microarchitecture Article No. 20, Oct. 15, 2016, 12 pages.

Y. Chen, et al., "DaDianNao: A Machine-Learning Supercomputer", 2014 47th Annual IEEE/ACM International Symposium on Microarchitecture, Dec. 13, 2014, pp. 609-622.

T. Luo, et al., "DaDianNao: A Neural Network Supercomputer", IEEE Transaction on Computers, vol. 66, No. 1, Jan. 2017, pp. 73-88.

T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.

Y. Chen, et al., "DianNao Family: Energy-Efficient Hardware Accelerators for Machine Learning", Communications of the ACM, vol. 59, No. 11, Nov. 2016, pp. 105-112.

D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.

Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.

* cited by examiner

APPARATUS AND METHODS FOR FORWARD PROPAGATION IN CONVOLUTIONAL NEURAL NETWORKS

CROSS-REFERENCE TO RELATED APPLICATIONS

The present invention is a continuation-in-part of PCT Application No. PCT/CN2016/080967, filed on May 4, 2016, which claims priority to commonly owned CN application number 201610282534.7, filed on Apr. 29, 2016. The entire contents of each of the aforementioned applications are incorporated herein by reference.

TECHNICAL FIELD

The present disclosure generally relates to the technical field of artificial neural network, and specifically, relates to an apparatus and method for forward propagation of a convolutional artificial neural network.

BACKGROUND

Convolutional artificial neural networks have been widely applied in pattern recognition and image processing for its high efficiency. One known type of devices for convolutional artificial neural networks is to implement a general-purpose processor, which includes a general-purpose register file and a general-purpose functional unit to execute general purpose instructions to support algorithms for convolutional artificial neural networks. However, one of the defects of the method is lower operational performance of a single general-purpose processor which cannot meet performance requirements for usual multilayer neural network operations. When multiple general-purpose processors execute concurrently, the intercommunication among them also becomes a performance bottleneck.

Another known type of devices may involve a graphics processing unit (GPU), which includes a general-purpose register file and a general-purpose stream processing unit to execute general purpose single-instruction-multiple-data (SIMD) instructions to support the algorithms. However, since GPU only contains rather small on-chip caching, then model data (weight values) of a multilayer artificial neural network may be repeatedly moved from the off-chip, and off-chip bandwidth becomes a main performance bottleneck, causing huge power consumption.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for forward propagation in a convolutional artificial neural network. The example apparatus may include a direct memory access unit configured to receive input data from a storage device and a master computation module configured to select one or more portions of the input data based on a predetermined convolution window. The example apparatus may include one or more slave computation modules respectively configured to convolute a convolution kernel with one of the one or more portions of the input data to generate a slave output value. Further still, the example apparatus may include an interconnection unit configured to combine the one or more slave output values into one or more intermediate result vectors, wherein the master computation module is further configured to merge the one or more intermediate result vectors into a merged intermediate vector.

Another example aspect of the present disclosure provides an example method for forward propagation of a convolutional artificial neural network. The example method may include receiving, by a direct memory access unit, input data from a storage device and selecting, by a master computation module, one or more portions of the input data based on a predetermined convolution window. Further, the example method may include convoluting, by one of one or more slave computation modules, a convolution kernel with one of the one or more portions of the input data to generate a slave output value. Further still, the example method may include combining, by an interconnection unit, the one or more slave output values into one or more intermediate result vectors.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

Computing processes in a convolutional neural network may be presented in a following equation: $S=s(\Sigma w x_i + b)$, in which $x_i$ may represent a portion of the input data selected based on a convolution window, w may represent a convolution kernel, b may represent a bias value, s( ) may represent an activation function, and S may represent an output vector. The sub-processing indicated by the equation may be respectively performed by different components of a neural network acceleration processor. In some examples, the convolution kernel w may be divided into one or more sub-kernels (e.g., convolution kernels 106A-106N) respectively designated for different components for further processing.

Figure 1A:
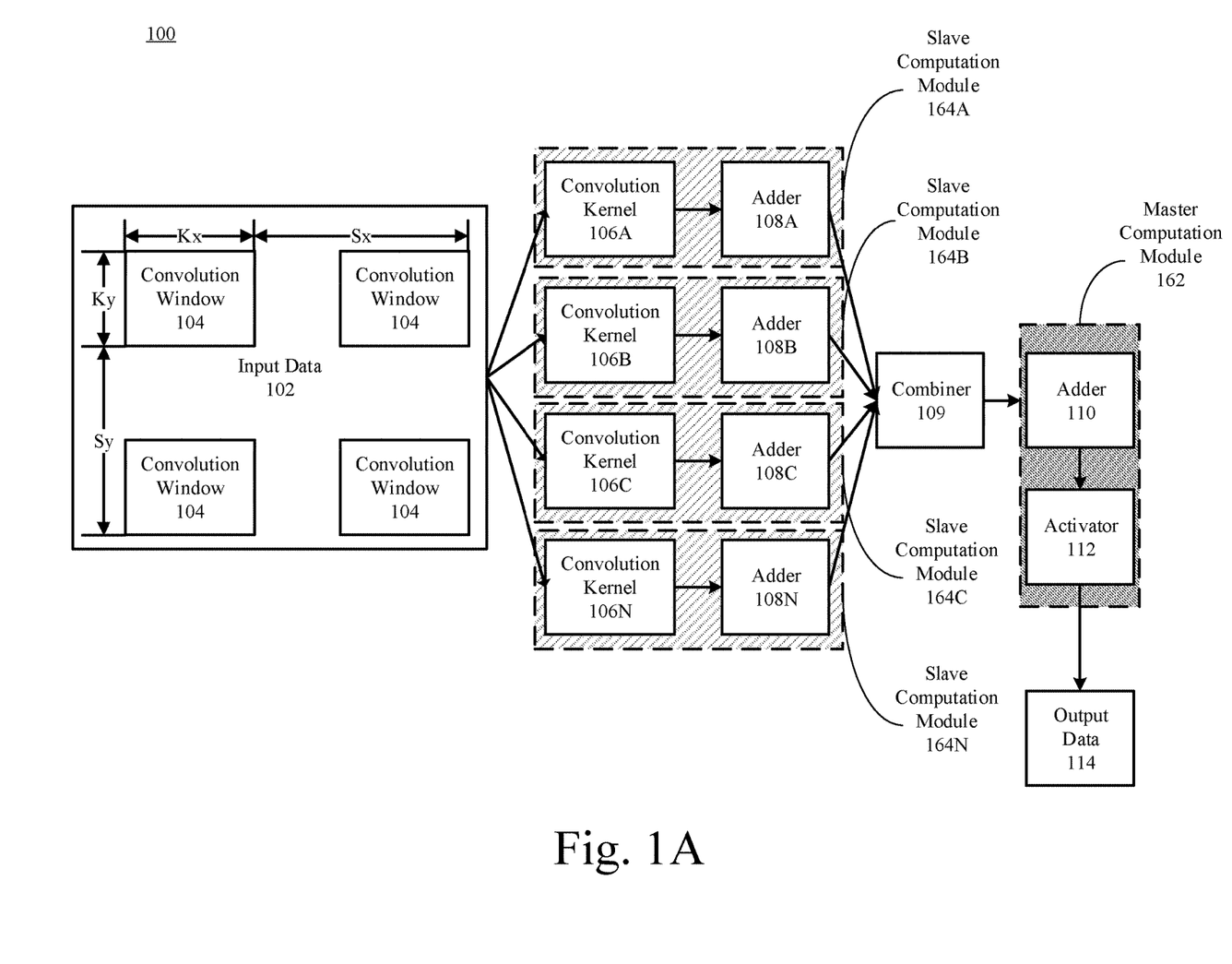
FIG. 1A is a block diagram illustrating an example computing process in a convolutional neural network.

FIG. 1A is a block diagram illustrating an example computing process 100 in a convolutional neural network. The example computing process 100 is a merely example showing operations that may be performed in a convolutional neural network and is not limited to such operations. For example, other unshown neural network operations may include pooling operations, etc.

As depicted, input data 102 may be stored or presented in a two-dimensional format, e.g., W number of values horizontally and H number of values vertically, or in a two-dimensional vector. In some non-limiting examples, the input data 102 may refer to an image in a pattern recognition process executed in a convolutional neural network. As the size of the input data 102 may be large and may cause reduction on overall system efficiency, the input data 102 may be segmented or divided into multiple subsets of data for further processing.

For example, a convolution window 104 may be predetermined for the segmentation or division. The convolution window 104 may be predetermined to include a fixed two-dimensional data range. That is, the data range in one dimension may be set to $K_x$ number of values and the data range in the other dimension may be set to $K_y$ number of values. In the example of a two-dimensional image, the convolution window 104 may refer to an area that includes $K_x$ horizontal pixels and $K_y$ vertical pixels.

The input data 102 within the convolution window 104 may be transmitted to other components for further processing. Once the processing is completed, the convolution window 104 may be configured to slide or move by a predetermined distance, e.g., $S_x$ number of values in the one dimension or $S_y$ number of values in the other dimension, to identify another subset of the input data 102. The newly identified subset of the input data may be transmitted and similarly processed. In some examples, the convolution window 104 may be configured to slide in one dimension, e.g., sliding by $S_x$ horizontally as shown in FIG. 1A, until the input data 102 in this dimension has been processed. The convolution window 104 may then be configured to move in another dimension, e.g., moving by $S_y$ vertically as shown in FIG. 1A.

In at least one example, $S_x$ may be set to a value that is greater than, equal to, or less than $K_x$. That is, when $S_x$ is greater than $K_x$, some portions of the input data 102 may not be selected and further transmitted. When $S_x$ is equal to $K_x$, all the input data 102 may be processed sequentially. When $S_x$ is less than $K_x$, some of the input data 102 may be processed more than once.

Further to the examples, a portion of the input data 102 identified by the convolution window 104 (hereinafter referred to as "$X_i$") may be transmitted to one or more slave computation modules 164 (e.g., 164A, 164B, 164C, . . . 164N). Each of the slave computation modules 164 may be configured to multiply the received Xi with a prestored convolution kernel (e.g., convolution kernel 164A).

The convolution kernels 164A-164N herein may refer to one or more portions of the convolution kernel w. Thus, in some examples, each slave computation module may store a convolution kernel that may be different from other convolution kernels stored in other slave computation modules.

The convolution kernel 164N, similar to $X_i$, may also refer to a group of two-dimensional data, e.g., a two-dimensional vector. The vector multiplication of the convolution kernel and $X_i$ may include two sub-processes. That is, elements of the convolution kernel and $X_i$ may be respectively multiplied and the results of the multiplication of the elements may be added together, e.g., by an adder 108A, to generate a slave output value at each of the slave computation modules 164.

The one or more slave output values generated respectively at the one or more slave computation modules 164 may be transmitted to and added together, e.g., by a combiner 109, to generate an intermediate result vector. In the example where N number of slave computation modules 164 are configured to process the input data 102, each of the slave computation modules 164 may generate a slave output value and, thus, the intermediate result vector may include N number of elements.

With respect to the multiple portions of input data 102 identified by the convolution window 104 during the sliding or moving, multiple intermediate result vectors may be generated by the combiner 109. In some example, the intermediate result vectors may be further transmitted to a master computation module 162. The master computation module 162 may be configured to first merge the multiple intermediate result vectors to generate a merged intermediate vector. Further, the master computation module 162 may be configured to add a bias value to the merged intermediate vector to generate a biased intermediate vector. Additionally, the master computation module 162 may be configured to activate the biased intermediate vector. In other words, the master computation module 162 may be configured to apply an activation function to the biased intermediate vector. The activation function may be a sigmoid function, a tanh function, a relu function, and a softmax function. The activated biased intermediate vector may then be output as an output vector, e.g., output data 114.

Figure 1B:
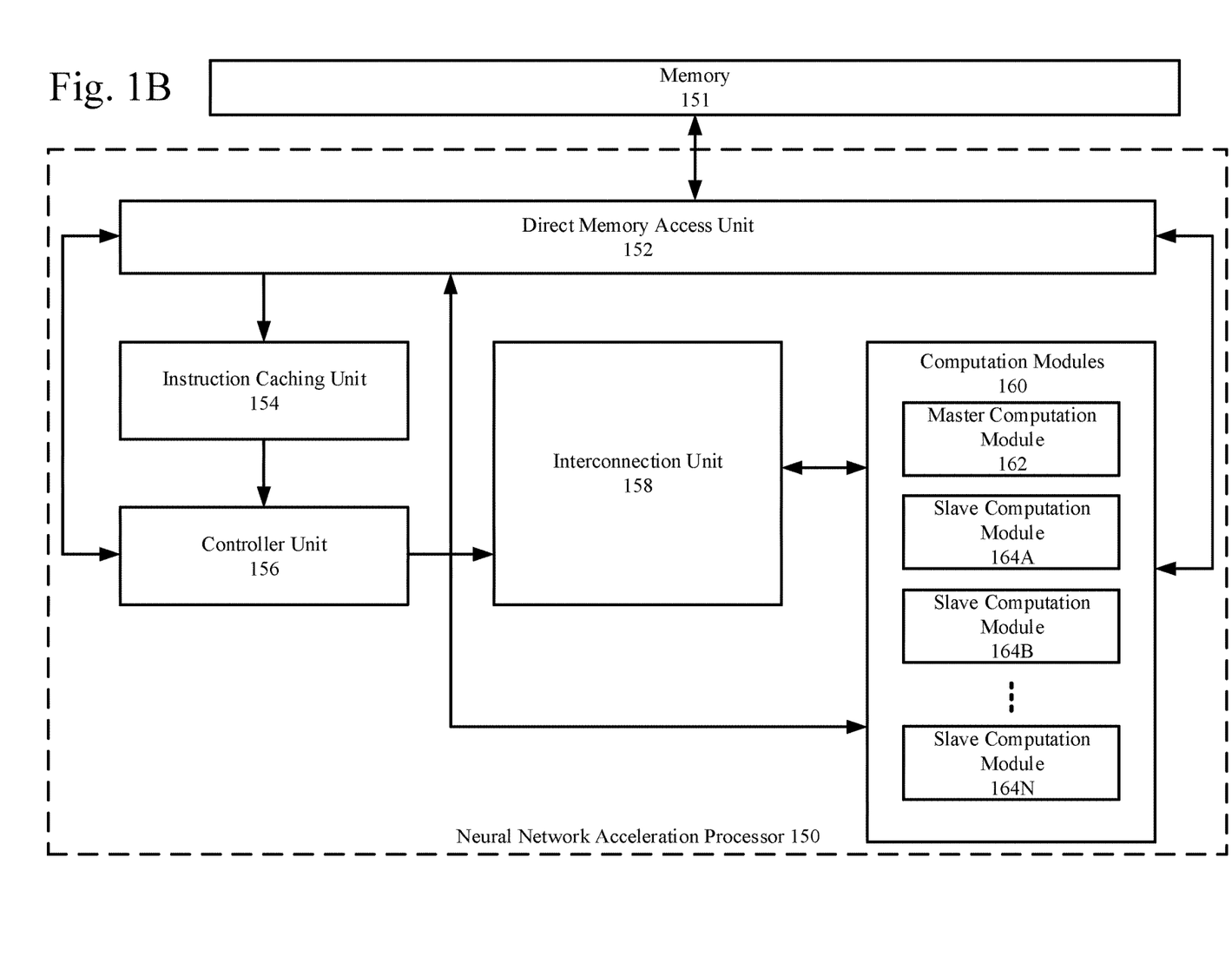
FIG. 1B is a block diagram illustrating the overall structure of a neural network acceleration processor by which forward propagation may be implemented in a convolutional neural network.

FIG. 1B is a block diagram illustrating the overall structure of a neural network acceleration processor 150 by which forward propagation may be implemented in a convolutional neural network. As shown in FIG. 1B, the apparatus comprises an instruction caching unit 154, a controller unit 156, a direct memory access unit 152, an interconnection unit 158, a plurality of computation modules 160 that may include the master computation module 162, and the multiple slave computation modules 164 (e.g., 164A, 164B . . . 164N). Any of the above-mentioned components or devices may be implemented by a hardware circuit (e.g., application specific integrated circuit (ASIC)).

In some examples, the instruction caching unit 154 may be configured to receive or read instructions from the direct memory access unit 152 and cache the received instructions. The controller unit 156 may be configured to read instructions from the instruction caching unit 154 and decode one of the instructions into micro-instructions for controlling operations of other modules including the direct memory access unit 152, the master computation module 162, the slave computation modules 164, etc. In other words, the modules including the direct memory access unit 152, the master computation module 162, and the slave computation modules 164 may be configured to respectively perform the micro-instructions.

The direct memory access unit 152 may be configured to access an external address range (e.g., in an external storage device such as a memory 151) and directly read or write data into respective caching units in the multiple computation modules 160.

In some example, an IO instruction may be pre-stored into a head address of the instruction caching unit 154. The IO instruction may instruct the direct memory access unit 152 to read the input data 102 from an external address space, e.g., the memory 151. The IO instruction may further instruct the direct memory access unit 152 to store the output data 114 back into the external space after completion of computation.

The controller unit 156 may be configured to read the IO instruction from the head address of the instruction caching unit 154. According to the decoded micro-instruction, the direct memory access unit 152 may be configured to read data relevant to the forward propagation (e.g., the input data 102, an interpolation table for the activation function, the bias value, parameters to configure the computation modules 160) and to store the above data to the master computation module 162.

The controller unit 156 may be further configured to read a next IO instruction from the instruction caching unit 154. According to the decoded micro-instructions of the IO instruction, the direct memory access unit 152 may be configured to read the one or more convolution kernels 106 from the memory 151.

Further still, the controller unit 156 may be configured to read a CONFIG instruction from the instruction caching unit 154 to configure the parameters for processing at the computation modules 160.

Once the computation modules 160 are configured accordingly, the controller unit 156 may be configured to read a COMPUTE instruction. The master computation module 162 may be configured, according the decoded micro-instruction of the COMPUTE instruction, to select a portion of the input data 102 based on the convolution window 104. Further, the master computation module 162 may transmit the portion of the input data 102 (e.g., $X_i$) to the slave computation modules 164 via the interconnection unit 158. The convolution window 104 may then be moved to by the predetermined distance by the master computation module 162.

The slave computation modules 164, in some example, may be configured to convolute the respective convolution kernels 106 with the selected portion of the input data 102 to generate the slave output values. The slave output values may then be transmitted to the interconnection unit 158 that may be configured to combine the slave output values to generate the intermediate result vector.

Upon receiving the multiple intermediate result vectors corresponding to the multiple portions of the input data 102, the master computation module 162 may be configured to merge the multiple intermediate result vectors to generate a merged intermediate vector. According to the micro-instructions decoded from the COMPUTE instruction, the master computation module 162 may be configured to add a bias value and/or to apply the activation function to the merged intermediate vector to generate the output vector.

Formats of the abovementioned instructions are provided here in Table 1.

TABLE 1

| Instruction (Operation Code) | Register 0 | Register 1 | Register 2 | Register 3 | Register 4 |
|---|---|---|---|---|---|
| COMPUTE | Starting address of input data | Data length of input data | Starting address of convolution kernel | Data length of convolution kernel | Address of interpolation table of activation function |
| IO | Address of external storage device | Data length | Address of internal storage device | | |
| NOP | | | | | |
| JUMP | Target address | | | | |
| MOVE | Address of input data | Data size | Address of output data | | |

Figure 2:
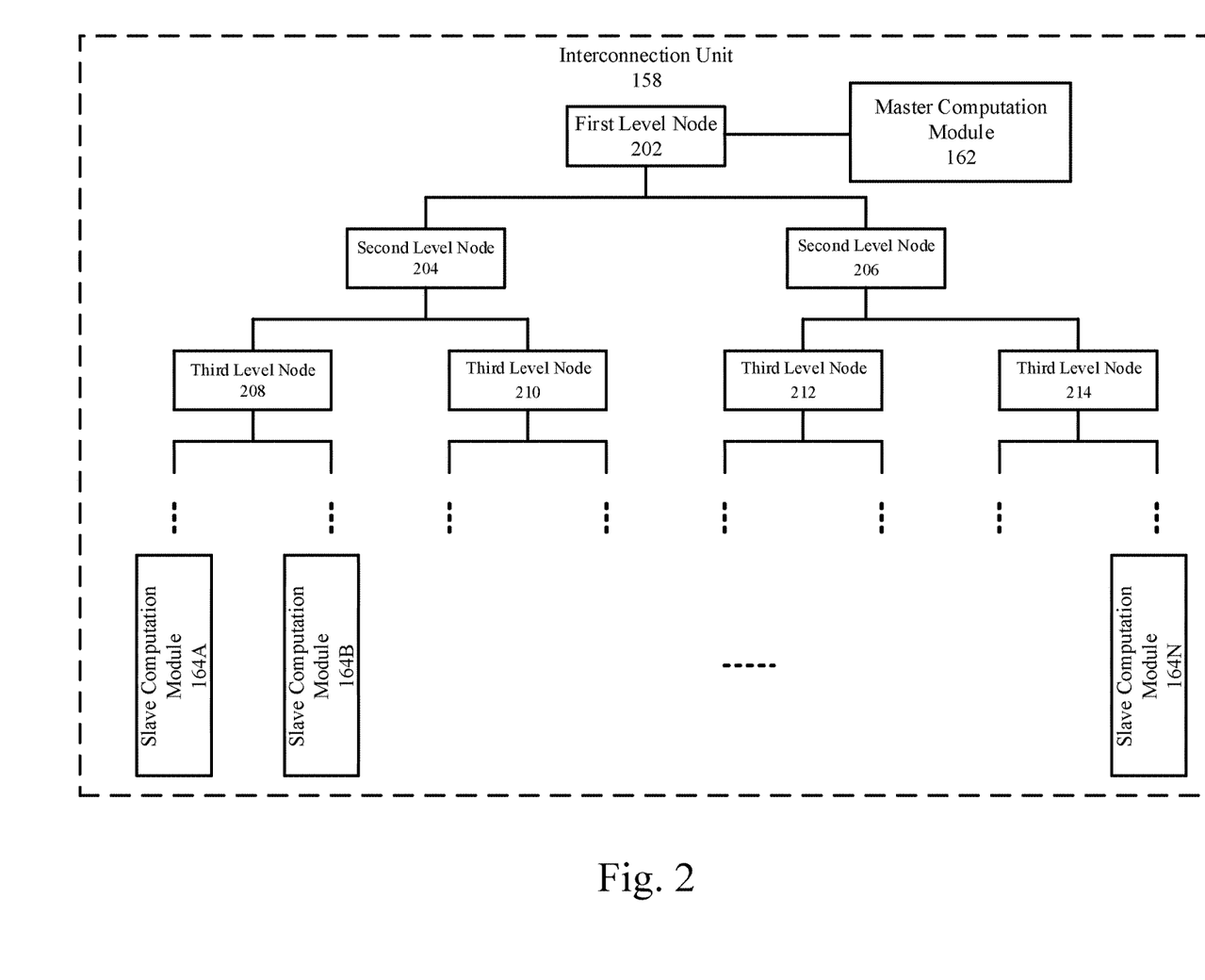
FIG. 2 is a block diagram illustrating the overall structure of an interconnection unit by which forward propagation may be implemented in a convolutional neural network.

FIG. 2 is a block diagram illustrating the overall structure of an interconnection unit 158 by which forward propagation may be implemented in a convolutional neural network.

As depicted, the interconnection module 108 may be structured as a binary tree that includes multiple levels (e.g., from top level to lower levels). Each level may include one or more nodes. Each node may be configured to send data to two nodes at a lower level. Further, each node may combine or add data received from two nodes at a lower level. The combined data may be transmitted to a node at a higher level. For example, the received data (e.g., a and b) from the two nodes at the lower level may be combined into a 2-dimensional vector (e.g., (a, b)) by the node at this level. The combined data, i.e., the 2-dimensional vector may be transmitted to a node at a higher level and further combined into a 4-dimensional vector. Alternatively, or additionally, each node may be configured to add data received from the two nodes at the lower level and the sum of the addition may be sent to the node at the high level.

Figure 3:
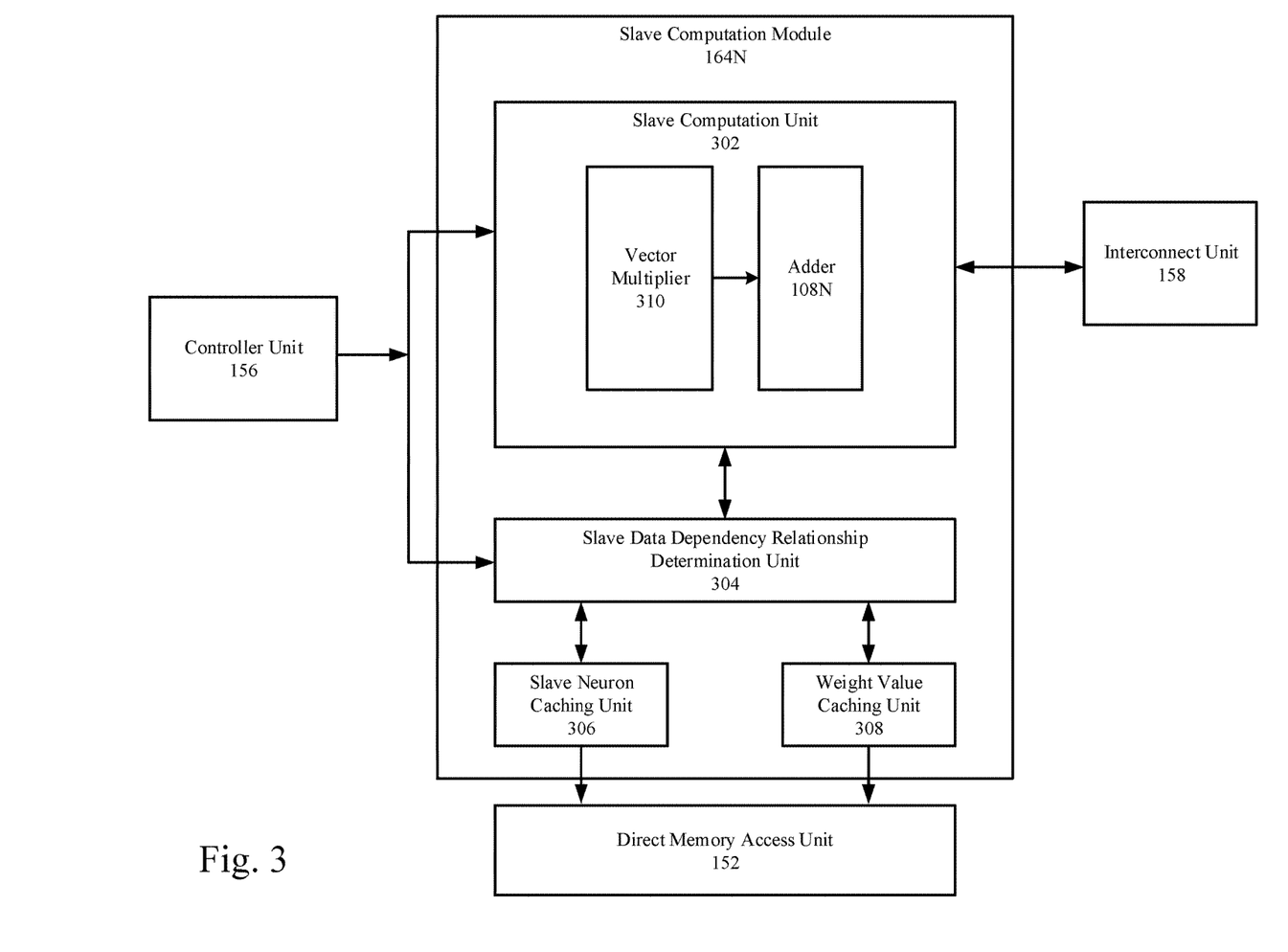
FIG. 3 is a block diagram illustrating the overall structure of a slave computation module by which forward propagation may be implemented in a convolutional neural network.

FIG. 3 is a block diagram illustrating the overall structure of a slave computation module (e.g., slave computation module 164N as shown) by which forward propagation may be implemented in a convolutional neural network.

As shown in FIG. 3, the slave computation module 164N comprises a slave computation unit 302, a slave data dependency relationship determination unit 304, a slave neuron caching unit 306, and a weight value caching unit 308. Hereinafter, a caching unit (e.g., a master neuron caching unit 406, a slave neuron caching unit 306, a weight value caching unit 308, etc.) may refer to an on-chip caching unit integrated in the neural network acceleration processor 150, rather than other storage devices in memory 151 or other external devices. In some examples, the on-chip caching unit may be implemented as an on-chip buffer, an on-chip Static Random Access Memory (SRAM), or other types of on-chip storage devices that may provide higher access speed than the external memory.

The slave data dependency relationship determination unit 304 may be configured to perform data access operations (e.g., reading or writing operations) on the caching units including the slave neuron caching unit 306 and the weight value caching unit 308 during the computation process. The slave data dependency relationship determination unit 304 may be configured to prevent conflicts in reading and writing of the data in the caching units including the slave neuron caching unit 306 and the weight value caching unit 308. For example, the slave data dependency relationship determination unit 304 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the slave data dependency relationship determination unit 304 may be stored in an instruction queue within the slave data dependency relationship determination unit 304. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The slave neuron caching unit 306 may be configured to store the convolution kernel 106N and the weight value caching unit 308 may be configured to store the selected portion of the input data 102.

The slave computation unit 302 may be configured to receive micro-instructions from the controller unit 156 and perform arithmetical logic operations according to the micro-instructions. In some examples, the slave computation unit 302 may further include a vector multiplier 310 and the adder 108N. The vector multiplier 310 may be configured to correspondingly multiply the elements included in the convolution kernel 106N with the elements included in the selected portion of input data 102. The results of the multiplication may be transmitted to the adder 108N, which may further add the results to generate a slave output value.

Figure 4:
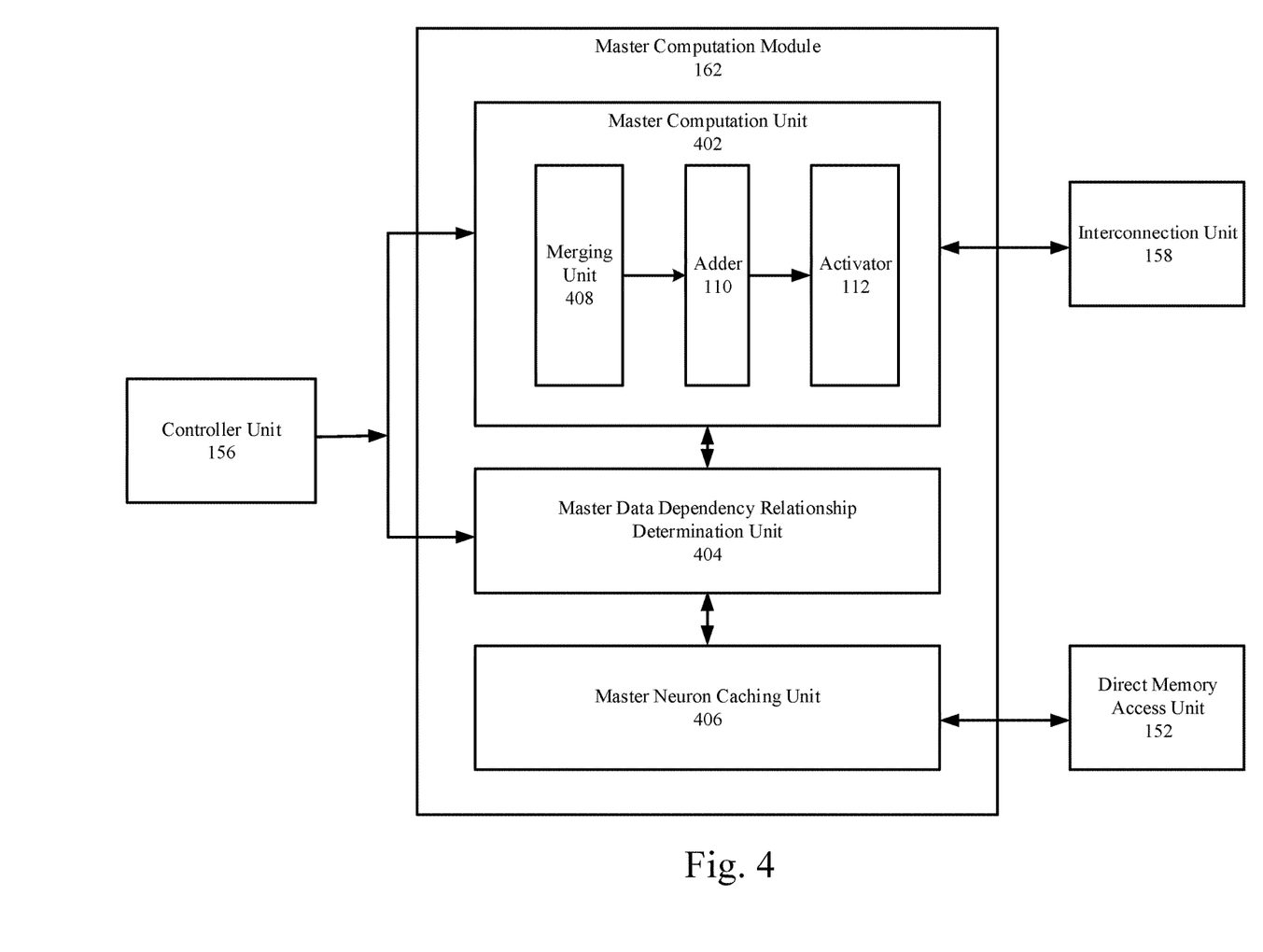
FIG. 4 is a block diagram illustrating the overall structure of a master computation module by which forward propagation may be implemented in a convolutional neural network.

FIG. 4 is a block diagram illustrating the overall structure of a master computation module 162 by which forward propagation may be implemented in a convolutional neural network. As shown in FIG. 4, the master computation module 162 comprises a master computation unit 402, a master data dependency relationship determination unit 404, and a master neuron caching unit 406. Similarly, a caching unit (e.g., the master neuron caching unit 406, the slave neuron caching unit 306, the weight value caching unit 308, etc.) may refer to an on-chip caching unit integrated in the neural network acceleration processor 150, rather than other storage devices in memory 151 or other external devices. In some examples, the on-chip caching unit may be implemented as an on-chip buffer, an on-chip Static Random Access Memory (SRAM), or other types of on-chip storage devices that may provide higher access speed than the external memory.

In some examples, the master data dependency relationship determination unit 404 may interface with the master computation unit 402 and the master neuron caching unit 406 and may be configured to prevent conflicts in reading and writing the data stored in the master neuron caching unit 406. For example, the master data dependency relationship determination unit 404 may be configured to determine whether there is a dependency relationship (i.e., a conflict) in terms of data between a micro-instruction which has not been executed and a micro-instruction being executed. If not, the micro-instruction may be allowed to be executed immediately; otherwise, the micro-instruction may not be allowed to be executed until all micro-instructions on which it depends have been executed completely. For example, all micro-instructions sent to the master data dependency relationship determination unit 404 may be stored in an instruction queue within the master data dependency relationship determination unit 404. In the instruction queue, if the target range of reading data by a reading instruction conflicts or overlaps with the target range of writing data by a writing instruction of higher priority in the queue, then a dependency relationship may be identified, and such reading instruction cannot be executed until the writing instruction is executed. Also, the master data dependency relationship determination unit 404 reads an input gradient vector from the master neuron caching unit 406 and then send the input gradient vector to the slave computation modules 164 through the interconnection module 158. The output data from the slave computation modules 164 may be directly sent to the master computation unit 402 through the interconnection module 158. Instructions output by the controller unit 156 are sent to the master computation unit 402 and the master data dependency relationship determination unit 404 to control the operations thereof.

In some examples, the master neuron caching unit 406 may be configured to store a bias value and data related to the activation function, e.g., an interpolation table for the activation function.

The master computation unit 402 may further include a merging unit 408, the adder 110, and the activator 112. Each time when the convolution window 104 is moved or adjusted, the merging unit 408 may be configured to merge the multiple intermediate result vectors received from the interconnection unit 158 with previously received intermediate result vector to generate a merged intermediate vector. The merged intermediate vector may be sent to the adder 110. The adder 110 may be configured to add the bias value to the merged intermediate vector to generate a biased intermediate vector. The biased intermediate vector may then be sent to the activator 112. The activator 112 may be configured to activate the biased intermediate vector. In other words, the activator 112 may be configured to apply an activation function to the biased intermediate vector in response to the COMPUTE instruction. The COMPUTE instruction may indicate an activation function to be applied to the biased intermediate vector. The activation function may be a sigmoid function, a tanh function, a relu function, or a softmax function. For example, the COMPUTE instruction may be one of a convolution network sigmoid instruction, a convolution network tanh instruction, a convolution network relu instruction, or a convolution softmax instruction.

The convolution network sigmoid instruction may include an address of the one or more portions of the input data, a size of the one or more portions of the input data, an address of the portion of the convolution kernel w, a size of the portion of the convolution kernel, and an indication of a sigmoid function as the activation function The convolution network tanh instruction may include an address of the one or more portions of the input data, a size of the one or more portions of the input data, an address of the portion of the convolution kernel, a size of the portion of the convolution kernel, and an indication of a tanh function as an activation function.

The convolution network relu instruction may include an address of the one or more portions of the input data, a size of the one or more portions of the input data, an address of the portion of the convolution kernel, a size of the portion of the convolution kernel, and an indication of a relu function as an activation function.

The convolution network softmax instruction may include an address of the one or more portions of the input data, a size of the one or more portions of the input data, an address of the portion of the convolution kernel, a size of the portion of the convolution kernel, and an indication of a softmax function as an activation function.

The COMPUTE instruction may also be a convolution network group instruction. The convolution network group instruction includes a first address of the one or more portions of the input data, a first size of the one or more portions of the input data, a second address of the portion of the convolution kernel, a second size of the portion of the convolution kernel, and an output address.

The intermediate result vectors received from the interconnection unit 108, the input data 202, the merged intermediate vector, the biased intermediate vector, and the activated biased intermediate vector may also be stored in the master neuron caching unit 406.

The activated biased intermediate vector may then be output as an output vector, e.g., output data 114, via the interconnection unit 158.

Figure 5:
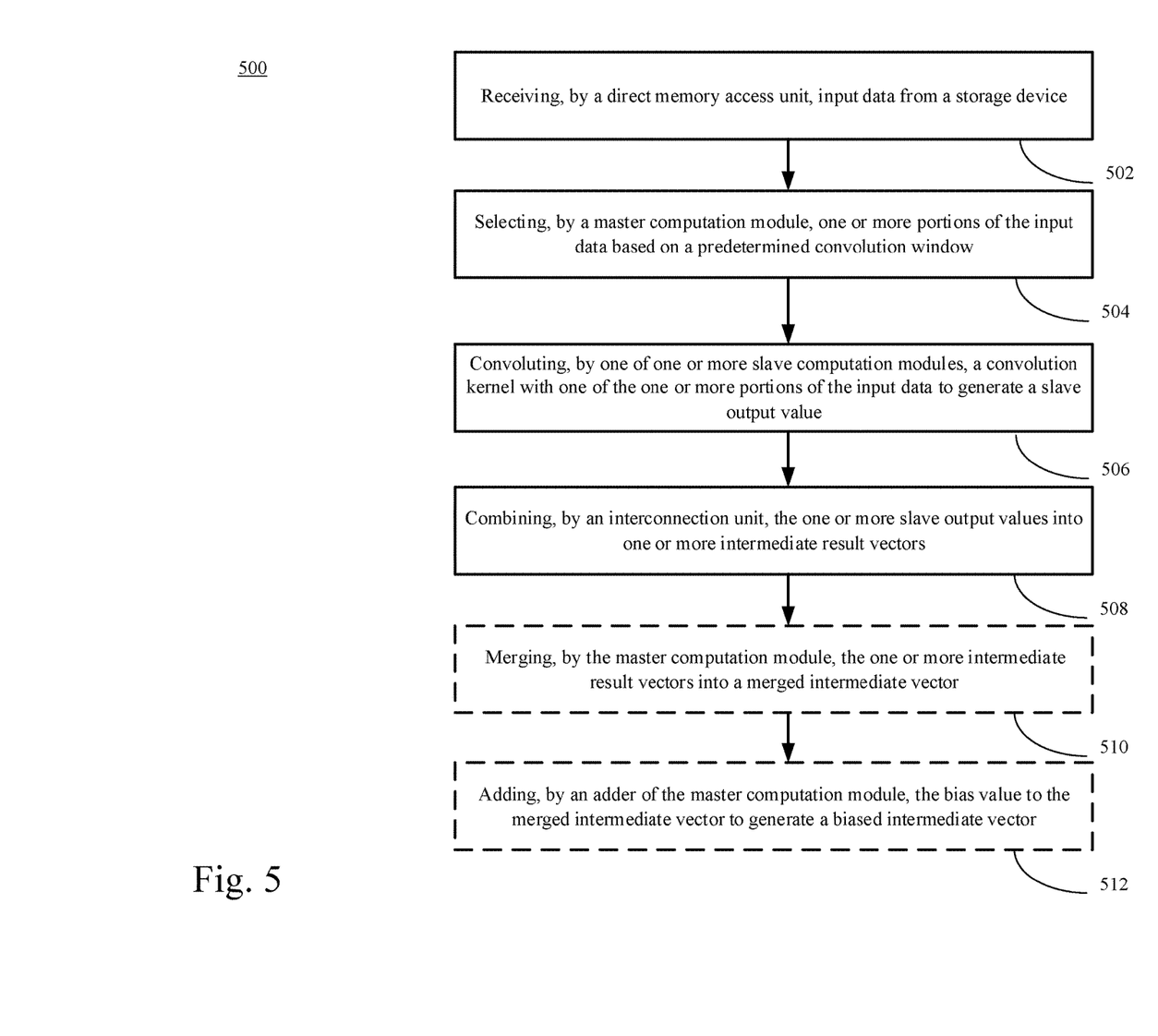
FIG. 5 is a flow chart of an example method for forward propagation in a convolutional neural network according to embodiments of the present disclosure.

FIG. 5 is a flow chart of an example method 500 for forward propagation in a convolutional neural network according to embodiments of the present disclosure. The method may be performed by one or more components of the apparatus of FIG. 1B and the sub-components thereof in FIGS. 3 and 4. The blocks illustrated in dash lines may indicate optional operations.

At block 502, the example method 500 may include receiving, by a direct memory access unit, input data from a storage device. For example, the director memory access unit 152 may be configured to read data relevant to the forward propagation (e.g., the input data 102, an interpolation table for the activation function, the bias value, parameters to configure the computation modules 160) from the memory 151.

At block 504, the example method 500 may include selecting, by a master computation module, one or more portions of the input data based on a predetermined convolution window. For example, the master computation unit 402 of the master computation module 162 may be configured, according decoded micro-instructions of the COMPUTE instruction, to select a portion of the input data 102 based on the convolution window 104.

At block 506, the example method 500 may include convoluting, by one of one or more slave computation modules, a convolution kernel with one of the one or more portions of the input data to generate a slave output value. For example, the slave computation modules 164 may be configured to convolute the respective convolution kernels 106 with the selected portion of the input data 102 to generate the slave output values.

At block 508, the example method 500 may include combining, by an interconnection unit, the one or more slave output values into one or more intermediate result vectors. For example, the slave output values generated by the slave computation modules 164 may be further transmitted to the interconnection unit 158. The interconnection unit 158 may be configured to combine the slave output values to generate an intermediate result vector.

At block 510, the example method 500 may include merging, by the master computation module, the one or more intermediate result vectors into a merged intermediate vector. For example, upon receiving the multiple intermediate result vectors corresponding to the multiple portions of the input data 102, the master computation module 162 may be configured to merge the multiple intermediate result vectors to generate a merged intermediate vector.

At block 512, the example method 500 may further include adding, by an adder of the master computation module, the bias value to the merged intermediate vector to generate a biased intermediate vector. For example, according to the micro-instructions decoded from the COMPUTE instruction, the master computation module 162 may be configured to add a bias value and/or to apply the activation function to the merged intermediate vector to generate the output vector.

The utilization of the apparatus and instruction set for performing the forward propagation computation of convolutional neural networks may eliminate the defects caused by lower performance of CPU and GPU operation as well as high overhead of front-end transcoding, which effectively improves the support to forward computations of multi-layer artificial neural networks.

In addition, the utilization of a specific on-chip cache for the backpropagation computation of multi-layer artificial neural network thoroughly explores the reusability of input neurons and weight data and avoids the repeatedly reading of data from memory. The requirement for memory access bandwidth is also lowered and thus the memory bandwidth will not become a bottleneck for performance of the back-propagation computation of multi-layer artificial neural networks.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for forward propagation of a convolutional neural network, comprising:
   a master computation circuit configured to
      receive input data, and
      select, in response to an instruction, one or more portions of the input data based on a predetermined convolution window, wherein the instruction is selected from the group consisting of a convolution network sigmoid instruction, a convolution network tanh instruction, a convolution network relu instruction, and a convolution network group instruction,
      wherein the instruction includes a first address of the one or more portions of the input data, a first size of the one or more portions of the input data, a second address of the portion of the convolution kernel, a second size of the portion of the convolution kernel,
      wherein the convolution network sigmoid instruction further includes an indication of a sigmoid function as an activation function,
      wherein the convolution network tanh instruction further includes an indication of a tanh function as the activation function,
      wherein the convolution network relu instruction further includes an indication of a relu function as the activation function, and
      wherein the convolution network group instruction further includes an output address;
   one or more slave computation circuits respectively configured to convolute a portion of a convolution kernel with one of the one or more portions of the input data to generate a slave output value; and
   an interconnection circuit configured to combine the one or more slave output values into one or more intermediate result vectors, wherein the master computation circuit is further configured to merge the one or more intermediate result vectors into a merged intermediate vector.

2. The apparatus of claim 1, wherein each of the one or more slave computation circuits includes a slave neuron caching circuit configured to store one of the one or more portions of the input data.

3. The apparatus of claim 1, wherein each of the one or more slave computation circuits includes a weight value caching circuit configured to store the portion of the convolution kernel that corresponds to the slave computation circuit.

4. The apparatus of claim 1, wherein each of the one or more slave computation circuits includes a vector multiplier configured to multiply the portion of the convolution kernel with each of the one or more portions of the input data.

5. The apparatus of claim 4, wherein each of the one or more slave computation circuits includes an adder configured to sum results of a multiplication of the portion of the convolution kernel with each of the one or more portions of the input data to generate the slave output value.

6. The apparatus of claim 1, wherein the master computation circuit includes a merging circuit configured to merge the one or more intermediate result vectors into the merged intermediate vector.

7. The apparatus of claim 6, wherein the master computation circuit includes
   a master neuron caching circuit configured to store a bias value; and
   an adder configured to add the bias value to the merged intermediate vector to generate a biased intermediate vector.

8. The apparatus of claim 7, wherein the master computation circuit includes an activator configured to activate the biased intermediate vector by applying an activation function to the biased intermediate vector.

9. The apparatus of claim 8, wherein the activation function is a function indicated by the instruction and selected from the group consisting of a sigmoid function, a tanh function, a relu function, and a softmax function.

10. A method for forward propagation of a convolutional neural network, comprising:
receiving, by a master computation circuit, input data;
 selecting, by the master computation circuit, one or more portions of the input data based on a predetermined convolution window in response to an instruction, wherein the instruction is selected from the group consisting of a convolution network sigmoid instruction, a convolution network tanh instruction, a convolution network relu instruction, and a convolution network group instruction,
 wherein the instruction includes a first address of the one or more portions of the input data, a first size of the one or more portions of the input data, a second address of the portion of the convolution kernel, a second size of the portion of the convolution kernel,
 wherein the convolution network sigmoid instruction further includes an indication of a sigmoid function as an activation function,
 wherein the convolution network tanh instruction further includes an indication of a tanh function as the activation function,
 wherein the convolution network relu instruction further includes an indication of a relu function as the activation function, and
 wherein the convolution network group instruction further includes an output address;
convoluting, by one of one or more slave computation circuits, a portion of a convolution kernel with one of the one or more portions of the input data to generate a slave output value; and
combining, by an interconnection circuit, the one or more slave output values into one or more intermediate result vectors.

11. The method of claim 10, further comprising merging, by the master computation circuit, the one or more intermediate result vectors into a merged intermediate vector.

12. The method of claim 10, further comprising storing, by a slave neuron caching circuit of each of the one or more slave computation circuits, one of the one or more portions of the input data.

13. The method of claim 10, further comprising storing, by a weight value caching circuit of each of the one or more slave computation circuits, the portion of the convolution kernel that corresponds to the slave computation module circuit.

14. The method of claim 13, wherein the convoluting further comprises adding, by an adder of each of the one or more slave computation circuits, results of a multiplication of the portion of the convolution kernel with each of the one or more portions of the input data to generate the slave output value.

15. The method of claim 10, further comprising:
storing, by a master neuron caching circuit of the master computation circuit, a bias value; and
adding, by an adder of the master computation circuit, the bias value to the merged intermediate vector to generate a biased intermediate vector.

16. The method of claim 15, further comprising activating, by an activator, the biased intermediate vector by applying an activation function to the biased intermediate vector.

17. The method of claim 16, wherein the activation function is a function selected from the group consisting of a sigmoid function, a tanh function, a relu function, and a softmax function.

* * * * *